March 10, 1953   A. M. ARBOGAST   2,630,649
ARTIFICIAL FISH LURE
Filed April 3, 1950

*INVENTOR.*
ALLEN M. ARBOGAST
BY
*William Cleland*
ATTORNEY

Patented Mar. 10, 1953

2,630,649

UNITED STATES PATENT OFFICE 2,630,649

ARTIFICIAL FISH LURE

Allen M. Arbogast, Akron, Ohio

Application April 3, 1950, Serial No. 153,710

3 Claims. (Cl. 43—42.12)

This invention relates to artificial fish lures.

One object of the invention is to provide an artificial fish lure, which upon being retrieved through the water at the end of a line, will have a lively wiggling and zig-zag action combined with a noisy disturbance and flashing of reflected light, which is extremely attractive to fish.

Other objects of the invention will be manifest from the following brief description and the accompanying drawing.

Figure 1:
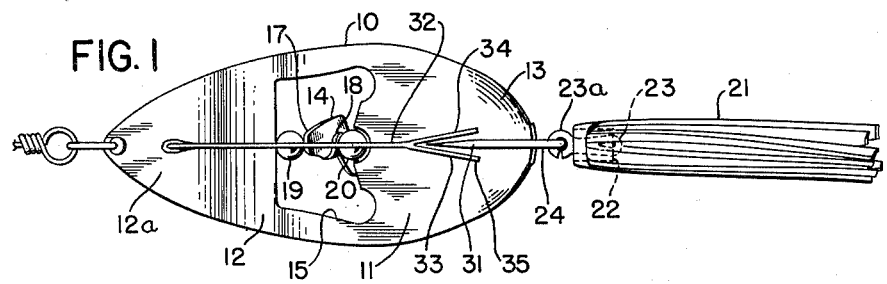
Figure 1 is a substantially full-sized top plan view of an artificial fish lure embodying the features of the invention.
Figure 2:
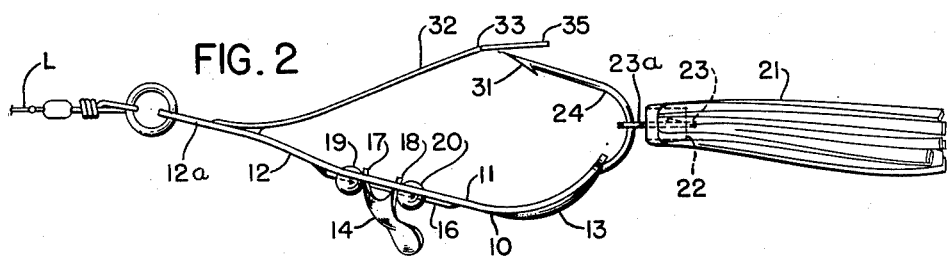
Figure 2 is a side elevation thereof.
Figure 3:
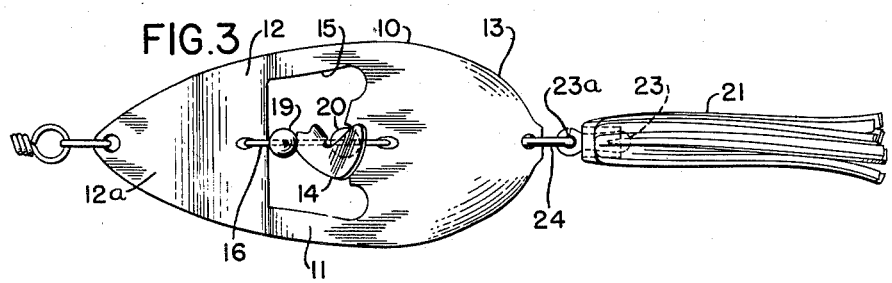
Figure 3 is a bottom plan view of the same.

Referring to the drawing, there is shown an artificial lure having a generally ovate or spoon-shaped body 10 of relatively thin metal stock, having approximately a third of its length centrally intermediate the ends of the same relatively flat, as indicated at 11, the forward portion 12 thereof being upturned at a slight angle to said flat portion and then extended forwardly to provide an off-set portion 12a substantially in parallelism with flat portion 11. The rear portion 13 of the body is upturned to a substantial extent, as best shown in Figure 2 and is concavo-convex with the concave side thereof presented upwardly, thereby to provide certain features of the desired bait action in the water, as will be described later, and to function as a stabilizer which maintains the bait body against turning over. The off-set forward end portion 12a is such that the bait, when drawn through the water in known manner, will move along at desired depth below the surface, as for example, about a foot, depending upon the manner of retrieving the bait.

For rotatably mounting a spinner 14 on the body 10, the flat central portion 11 thereof has an opening 15 provided through the same, across which is suitably secured a wire stem or shaft 16, to extend along the longitudinal center-line of the body, the axis of said shaft being shown located beneath the plane of said flat portion 11. The dimensions of the opening 15 are such that its length corresponds substantially to the width of the portion 11, and its width is less than the length of that portion. The spinner 14 is of the fluid-pressure rotatable type, including a single suitably pitched blade and spaced apertured lugs 17 and 18 through which the shaft 16 is rotatably received. Metal bead spacers 19 and 20 may be loosely mounted on the stem at opposite ends of the spinner to assure free rotation of the spinner, that is, without the same fouling with the edges of the body around said opening 15. If desirable, the forward bead 19 may be omitted.

For providing further stability as well as life-like action in the bait, a tail or streamer 21 may be releasably attached to extend rearwardly from the rear edge portion of the body 10, as by means of a tubular elastic portion 22 of the tail being expanded over an enlargement 23 having an eyelet 23a through which is freely received the curved portion of a single bait hook 24 attached to the body at the rear end thereof. The arrangement is such that the attachment 23 with the tail 21 thereon, is free to swing in vertical and horizontal planes with respect to the body 10.

The single-barb hook 24 may be attached, as by soldering, brazing, or other means, to the upper face of the rear body portion to have its barbed end 31 extending forwardly of the body, as shown. Other hook means (not shown) may be provided, however.

A weed guard 32 of elongated resilient material, such as steel wire, may be secured to the forward end of body 10 to extend rearwardly, freely above said spinner 14 to adjacent said barbed hook end. The free end 33 of the weed guard is shown as having a bifurcation providing weed deflecting portions 34 and 35 extending at opposite sides of the barbed end 31 of the hook.

In use of the improved fish lure for casting or trolling, it is retrieved or drawn through the water at the end of line L, and on a relatively slow retrieve it will move with a combined zig-zag and wiggling action. That is, the forward end of the body 10 will move slightly from side to side with respect to a given line of travel while the tail end will swing in the opposite directions, giving the bait the appearance of darting from side to side in the manner of a minnow or other small water creature. At the same time, with this wiggling movement of the body, the tail 21 will swing or wave from side to side in directions opposite to the wiggling movement of the body. This action is further enhanced by the rush of water through the opening 15 in body 10, causing the spinner to rotate, thereby producing a flashing of reflected light, particularly if the spinner is chrome or otherwise mirror-plated.

All in all, the bait will have a variety of life-like movements combined with noisy action and the aforementioned flashing of light on the spinner. When the bait is retrieved at a relatively faster rate of speed, it will ride upon or nearer the surface of the water, but the action and noise will be otherwise similar in varying degrees.

Figure 4:
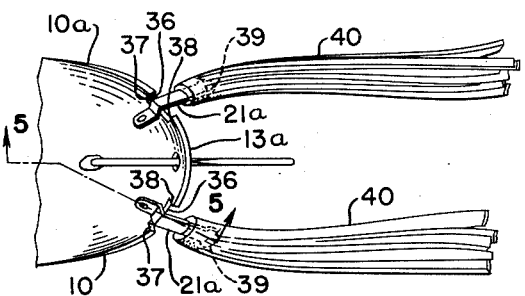
Figure 4 is a fragmentary top plan view of a modified form of rear portion which may be incorporated in the lure of Figures 1 to 3.
Figure 5:
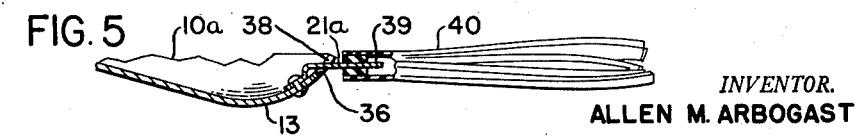
Figure 5 is a cross-section taken substantially on the line 5—5 of Figure 4.

Referring to Figures 4 and 5 there is shown a modified form of the tail-attaching means for a bait body 10a, otherwise similar to the body 10. Each tail attachment may comprise a flat paddle-like member 21a pivoted to the upper side of the body adjacent the upturned rear edge portion 13a, the member being off-set adjacent the pivot point to facilitate free lateral pivotal movement on the concave face of the body. The edges of the body are shown as having cut-out portions 36, providing laterally spaced stop shoulders 37 and 38 which limit lateral swinging movement of the members 21a, the latter being provided with enlargements 39 over which tubular elastic ends of suitable tails 40 may be expanded.

Other modifications of the invention may be resorted to without departing from the spirit thereof or the scope of the appended claims.

What is claimed is:

1. An artificial fish lure, comprising a generally ovate body of relatively thin metallic material having an opening therein intermediate forward and rear ends thereof, fish-line attaching means at the forward end of said body, hook means attached to said body, rearwardly of said opening, a stem extended across said opening coextensively with a longitudinal axis of the body, and a spinner rotatably received on said stem adapted to be rotated by water-pressure as the bait is drawn through water at the end of the fish-line, the rear portion of said body being upturned with respect to the intermediate portion thereof and being concavo-convex with the concave side toward the upper side of the bait, tail attaching members laterally pivotally secured to the upturned rear portion of said body to be at opposite sides of the longitudinal center-line thereof, the rear edge portions of said body having cut-outs providing spaced stop shoulders engageable by said attaching members for limiting lateral pivotal movement thereof in either direction.

2. A non-spinning fish lure comprising an ovate spoon of symmetrical form defining in longitudinal section an element having a substantially flat front portion followed by a downwardly curved second portion preceding a substantially flat third portion followed by a fourth concave portion having a downwardly presented convex side, the third portion having an opening therein of a length substantially corresponding to the width of that portion and a width less than the length of that portion, parts of the portions of the spoon defining wall edges of the opening having ends of a shaft secured thereto, said shaft being positioned in the longitudinal center of the spoon, a spinner mounted on said shaft, the forward edge of the opening when the body is trolled in water being at a higher level than the rear edge of the opening, said spoon having front line attaching means and rear hook means secured to said spoon rearwardly of the opening in alignment with the shaft, and a guard for the hook means and spinner secured forwardly of the front edge of the opening.

3. A non-spinning fish lure comprising an ovate spoon of symmetrical form defining in longitudinal section an element having a substantially flat front portion followed by a downwardly curved second portion preceding a substantially flat third portion followed by a fourth concave portion having a downwardly presented convex side, the third portion having an opening therein of a length substantially corresponding to the width of that portion and a width less than the length of that portion, parts of the portions of the spoon defining wall edges of the opening having ends of a shaft secured thereto, said shaft being positioned in the longitudinal center of the spoon, a spinner mounted on said shaft, the forward edge of the opening when the body is trolled in water being at a higher level than the rear edge of the opening, said spoon having front line attaching means and rear hook means secured to said spoon rearwardly of the opening in alignment with the shaft, a guard for the hook means and spinner secured forwardly of the front edge of the opening, and means for attaching flexible tail portions to extend rearwardly from said hook means.

ALLEN M. ARBOGAST.

REFERENCES CITED

The following references are of record in the file of this patent:

UNITED STATES PATENTS

| Number | Name | Date |
| --- | --- | --- |
| 576,680 | Kittle | Feb. 9, 1897 |
| 719,704 | Trakel | Feb. 3, 1903 |
| 831,552 | Hallstrom | Sept. 25, 1906 |
| 1,583,199 | Taylor | May 4, 1926 |
| 1,785,310 | Johnson | Dec. 16, 1930 |
| 2,111,020 | Arbogast | Mar. 15, 1938 |
| 2,208,827 | Accetta | July 23, 1940 |
| 2,236,023 | Turner | Mar. 25, 1941 |
| 2,527,743 | La Rue | Oct. 31, 1950 |
| 2,562,743 | Schindler et al. | July 31, 1951 |